United States Patent [19]
Doherty

[11] 3,983,482
[45] Sept. 28, 1976

[54] DELAYED PULSE TRANSMISSION SYSTEMS

[75] Inventor: William H. Doherty, Summit, N.J.

[73] Assignee: Bell Telephone Laboratories, Incorporated, Murray Hill, N.J.

[22] Filed: Nov. 14, 1951

[21] Appl. No.: 256,273

[52] U.S. Cl. ............................... 325/6; 343/18 E
[51] Int. Cl.² ............................................. H04K 3/00
[58] Field of Search ................. 343/101.1, 17.7, 18, 343/6.5, 6.8, 18 E; 250/17 J, 15, 15 T; 325/6

[56] References Cited
UNITED STATES PATENTS

| | | | |
|---|---|---|---|
| 2,440,253 | 4/1948 | Dodington | 343/18 X |
| 2,453,970 | 11/1948 | Charrier | 343/101.1 |
| 2,477,485 | 7/1949 | Jacob | 343/17.7 X |
| 2,489,273 | 11/1949 | Dodington | 343/18 X |
| 2,544,204 | 3/1951 | Whitfield et al. | 343/101.1 |
| 2,546,985 | 4/1951 | Dodington | 325/6 |
| 2,572,088 | 10/1951 | Young et al. | 343/101.1 |
| 2,574,271 | 11/1951 | Longhren | 250/15 X |
| 2,703,881 | 3/1955 | Bergemann | 343/18 |
| 2,931,031 | 3/1960 | Deloraine et al. | 325/6 |
| 2,943,318 | 6/1960 | Deloraine et al. | 325/6 |

*Primary Examiner*—Howard A. Birmiel
*Attorney, Agent, or Firm*—A. J. Torsiglieri; H. S. Wentz; D. P. Kelley

EXEMPLARY CLAIM

1. In combination, means normally unblocked for receiving incident wave energy pulses, a multi-resonant cavity supplied with the received pulses for storage of the radio frequency energy in said pulses, means normally blocked to be supplied with the received pulse energy for transmitting said received pulse energy after storage for a finite time in said multi-resonant cavity, a control circuit for disabling the receiving means and enabling the transmitting means at intervals subsequent to the reception of incident pulses, and a timing source for continuously varying the duration of said intervals.

5 Claims, 12 Drawing Figures

INVENTOR
W. H. DOHERTY
BY Hugh S. Wertz
ATTORNEY

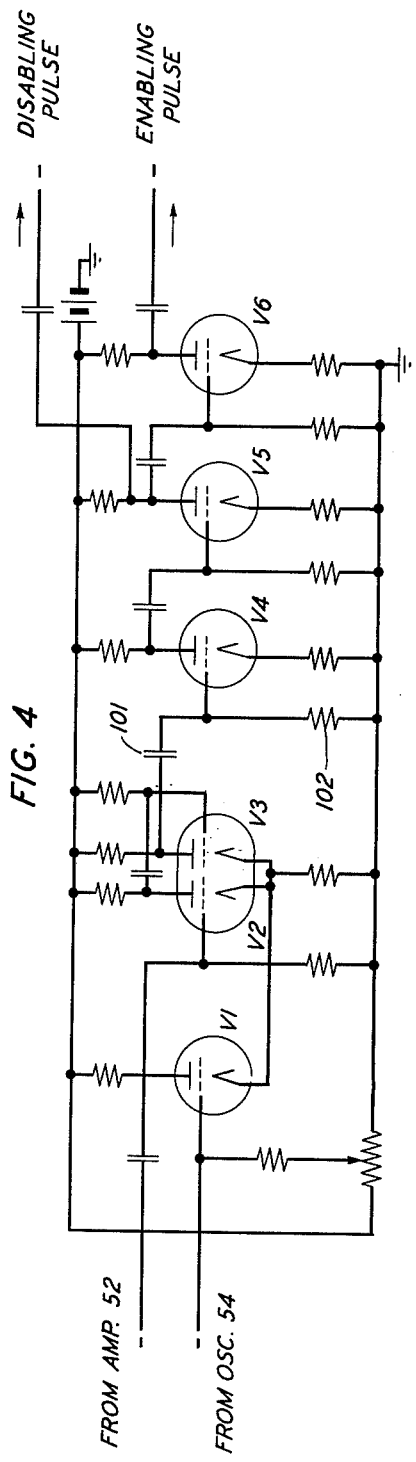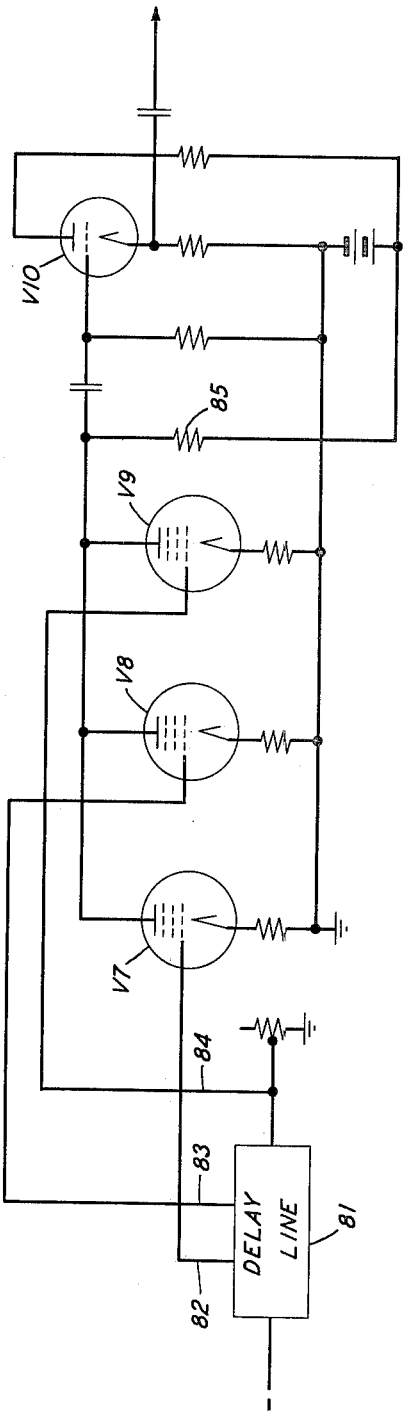

DELAYED PULSE TRANSMISSION SYSTEMS

This invention relates to pulse transmission systems and, more particularly, to delayed repeaters for such systems.

In one application, the invention relates to long distance radio communication systems which utilize relay stations along the transmission path, each of which stations receives pulses emitted by the preceding station and retransmits them to the succeeding station. In systems of this kind, it is important to minimize interference between the reception and retransmission operations. One technique that has been suggested hitherto is the use of a delayed repeater system. Each received pulse, after amplification in the receiver, is delayed by conventional delay elements for a specified time interval, after which interval it is applied to a transmitter for retransmission. Isolation between the two operations is secured by utilizing a normally unblocked receiver and a normally blocked transmitter, and thereafter initiating at the cessation of the received pulse a control signal which, after a delay interval, acts temporarily to block the receiver and unblock the transmitter for a time sufficient for the retransmission operation.

However, hitherto the usefulness of such an arrangement has been limited by the difficulty in securing conveniently the desired delay of the received pulse before retransmission, especially for applications where this delay needs to be relatively long or easily variable and where the frequency characteristics of the pulse are to be preserved.

Accordingly, one object of the present invention is to improve the operation of delayed repeater systems of this kind by providing a novel arrangement for delaying the received pulse until the time for its retransmission.

To this end, one feature of the present invention is the use in such repeater systems of a cavity resonator, of the kind known in the art as an echo box, for storing the received ratio frequency energy from the time of its reception to the time when the output transmitter has been enabled to permit retransmission. Such a resonator permits convenient storage of the received pulse energy for intervals of several microseconds. At the radio frequencies at which operation is contemplated, for comparable delays with conventional delay elements, such as delay lines, lengths of hundreds of feet are necessary. Moreover, resonant cavities can be designed for such purposes with efficiencies that compare favorably with the losses suffered in conventional delay networks. At the same time, the control signal which enables the transmitter and disables the receiver is developed from the received pulse by a separate control network operating at frequencies at which conventional delay methods can be efficiently utilized. By providing isolation between the signal path and control path in this way, there is minimized the problem of signal distortion by the delay inserting arrangement, which no longer is in the signal forward transmission path. Additionally, the delay inserted in this case can easily be made variable since a measure of the received pulse remains continually and readily available in the cavity resonator until desired for utilization, relatively unaffected qualitatively by changes in the control network. Moreover, by the flexibility of delay achieved by this storage process, there is obviated the need for exact correspondence between the arrival times of the signal pulses and the control pulses at the transmitter, since the signal energy is stored and remains ready for use until needed. These latter considerations make possible new fields of application for such delayed repeater systems.

In particular, the delayed pulse repeater of the present invention is especially useful in applications where the received pulses are completely random and their frequency, spacing, and duration vary between wide limits so that it would be difficult to control and synchronize exactly the delays required for successful operation.

Accordingly, in another important field of application, the invention relates to a radar countermeasure system in which the delayed repeater is utilized to transmit spurious echoes in order to confuse the enemy radar. Additionally, for still another application, the invention will be described for utilization in an IFF (Identification Friend-or-Foe) system in which the delayed repeater is utilized for transmitting identification pulses in response to a friendly radar.

The invention will be better understood from the following more detailed description and accompanying drawings in which:

FIG. 4 shows schematically a suitable form of a delayed pulse generator for use in the arrangement of FIG. 2;

FIG. 5 shows schematically a typical coding circuit for incorporation in the recognition apparatus of FIG. 3.

Figure 1:
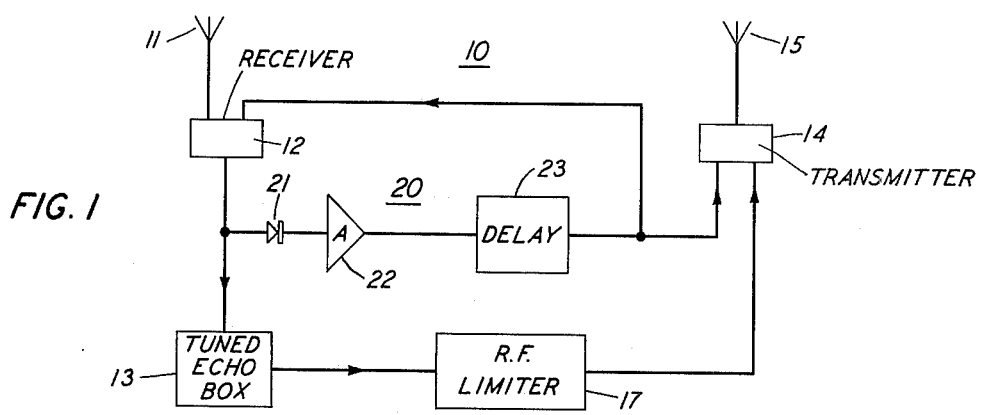
FIG. 1 shows in block form a delayed repeater station in accordance with the invention.

With more specific reference to the drawings, FIG. 1 shows a repeater station 10 suitable as a link in a chain of relay stations spaced along the transmission path of a radio communication system. Incoming pulse signals from the preceding link are applied by way of the antenna 11 to the input receiver 12 for amplification. The amplified signal is then stored in an echo box or cavity resonator 13, which stores the energy of the pulse and remains ready for some time after the termination of the pulse to return some of this energy to the output transmitter 14 for further amplification and retransmission by the antenna 15. The station 10 can be made to handle wide frequency bands, if desired, by utilizing wide band amplifiers, such as, for example, traveling wave amplifiers in the receiver and transmitter, and untuned echo boxes therebetween which have a multiresonant response at frequencies relatively closely spaced throughout the desired band. Such an untuned echo box or multiresonant cavity resonator can, for example, be of the kind described in U.S. Pat. No. 2,518,383 which issued Aug. 8, 1950 to S. A. Schelkunoff. However, in general, it is preferable to have the station operate over a relatively narrow band, in which case more conventional amplifiers and tuned echo boxes can be utilized. A suitable tuned echo box or resonant cavity resonator is described in U.S. Pat. No. 2,471,419 which issued May 31, 1949 to W. A. Edson and W. F. Kannenberg.

To isolate the reception and retransmission operations and thereby minimize "singing," the receiver 12, although normally in a condition of receptivity, is disabled during intervals of retransmission, while the transmitter 14, which is normally blocked, is enabled for a short time after reception of a pulse to permit retransmission. To this end, at the same time that the receiver output is being stored in the echo box 13, it is also applied as an input to a control network which acts to produce, after a preset interval sufficient to insure complete reception of the incoming pulse, a gating or control pulse for utilization in simultaneously disabling the receiver and enabling the transmitter for the interval during which the pulse is to be retransmitted. In the arrangement shown, which is one adapted primarily for the transmission of video signals impressed on a suitable radio frequency carrier, the control network comprises a conventional envelope detector 21 whose output will represent the video shape of the envelope of the incoming pulse, a suitable video amplifier 22, and a video delay element 23 whose parameters are chosen to provide the desired delay. The output of the element 23 is utilized as the control pulse desired. A control network of this sort makes possible a repeater system which is essentially non-regenerative, preserving relative amplitude values, and hence can be used with conventional pulse amplitude modulated systems as well as pulse position modulation, pulse frequency modulation, and pulse code modulation systems. Alternatively, the control network can comprise, for example, a conventional pulse generator of the kind which is triggered by the incoming pulse to produce a delayed output pulse which can be adjusted to follow this trigger by a preset interval. Then, after the control pulse is derived, conventional methods can be employed for the disabling and enabling of the particular amplifiers thereby. In particular, the pulse can be applied at an appropriate polarity to a control element of an amplifier tube in the receiver or transmitter to serve the desired function. Other suitable arrangements for rendering the receiver 12 inoperative during the operation of the transmitter 14 can be devised by one skilled in the art.

Additionally, in the particular arrangement shown, a radio frequency amplitude limiter 17 is interconnected between the echo box and the transmitter to remove amplitude variations caused by the gradual decay of the echo box energy so that the transmitter input is nearly constant over the entire transmitting interval.

This arrangement provides a pulse output whose frequency characteristics are substantially identical to that of the received incoming pulse. However, it can be seen that by appropriate modification this arrangement can easily be arranged to produce a pulse output of new frequency characteristics. For example, the output of the tuned echo box can be modulated or otherwise frequency converted before application to the output amplifier and in this way there can be derived pulses of new frequencies.

Figure 2:
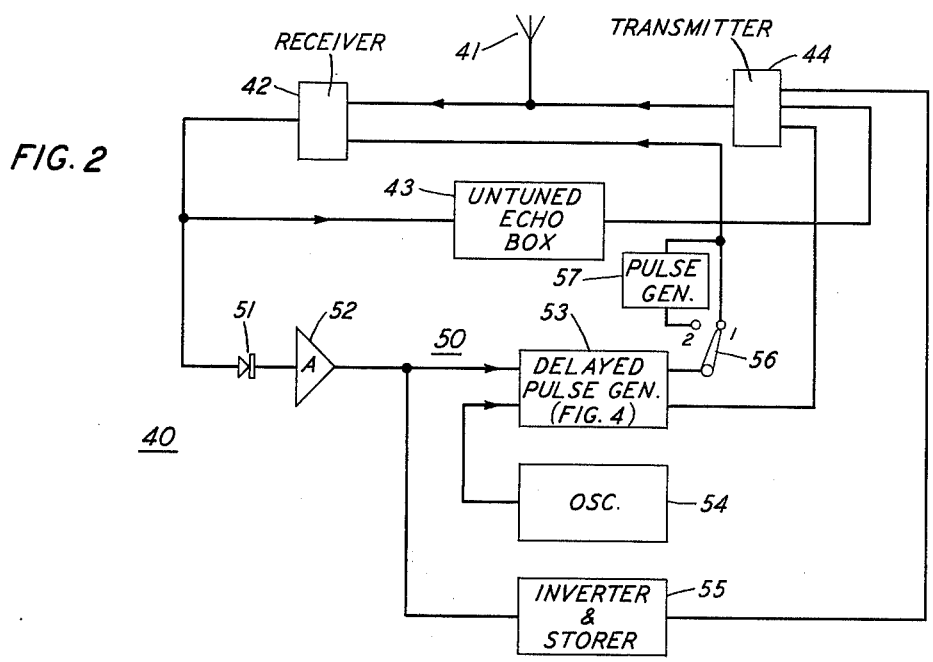
FIG. 2 shows in block form a radar countermeasure arrangement in accordance with the invention.

The basic form of this repeater can be modified in various ways to adapt it to various other applications. FIG. 2 shows particularly an arrangement 40 for use on an airplane, ship, or other movable or fixed target to falsify information being obtained about such target by an enemy radar. In radar, an intermittent series of short radio frequency pulses is transmitted in the direction of a target and information about the target is derived from the timing of pulse echoes reflected by the target. The present arrangement makes possible the emission by the target of pulses of the same frequency as the pulses received at the target from the enemy radar, but delayed in time by an amount which is controlled and varied in such a manner as to cause maximum error and confusion in the radar. Range falsification of this sort is achieved by confusing true reflection echoes with spuriously generated echoes to the extent that discrimination therebetween is impracticable. To this end, a radar pulse received by the antenna 41 is amplified in a broad band input amplifier in the receiver 42, which, for example, can be a traveling wave amplifier, and supplied to an untuned echo box 43, whose frequency band is made wide enough to include the region of operation expected for the enemy radar. The multiresonant cavity resonator to which reference has already been made above is an example of a suitable element for storage of the pulse energy for the interval before retransmission. In applications of this kind, it may be desirable, for maximum confusion of the enemy, to permit "singing" between the output transmitter and the input receiver. In this way, each incoming pulse acts to set up a train of echo pulses which soon completely clutter the intervals between successive radar transmitted pulses. Choice between regenerative operation in this way or in the non-regenerative manner described in connection with FIG. 1 is made possible by switch 56. In position 1, the non-regenerative position, there is utilized, as before, a control circuit which acts after the cessation of the incoming pulse both to disable the receiver 42 and also to enable the transmitter 44 which amplifies the stored pulse preliminary to radiation by the antenna 41. In the exemplary embodiment being illustrated, the control circuit includes a detector element 51 responsive to the pulse being applied to the echo box, an amplifier 52 which raises the level of the detected pulse, and a delayed pulse generator 53 which is actuated by the amplified detected pulse and creates at a later time a new pulse which momentarily enables the transmitter and simultaneously disables the receiver.

To achieve most fully the advantages of the present invention, when used with switch 56 in position 1 as above, provision is made for continuously varying the delay introduced by the delayed pulse generator 53 and, accordingly, continuously varying the time interval between the reception and retransmission of the radar pulse. In this way, discrimination between true and spurious echoes can be made more difficult. To this end, the delayed pulse generator is controlled both by the received pulse and a timing signal which is locally generated. This timing signal, for example, can be supplied, as shown, from a saw-tooth oscillator 54 having a long time period, such as 5 seconds, which would cause the range indicated at the radar to vary at a rate that would be extremely confusing to a range operator or computer. Alternatively, in place of the oscillator, a noise source can be utilized to provide an aperiodic timing pulse for similar use. Delay times provided by the delayed pulse generator are made preferably of the order of 1 to 5 microseconds, a time short enough to assure ample residual energy in the box, and still long enough to result in appreciable range errors.

Figure 6A:
FIGS. 6A through 6E and 7A and 7B are wave forms used in an explanation of the arrangements shown in FIGS. 4 and 5, respectively.
Figure 6B:
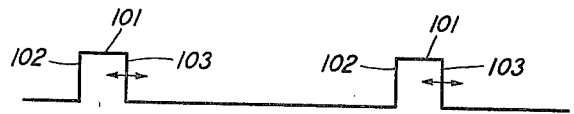
Figure 6C:
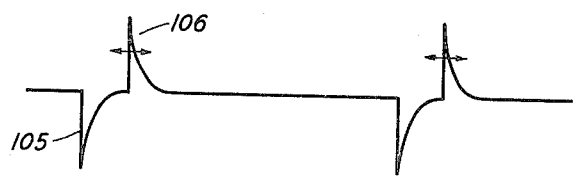
Figure 6D:
Figure 6E:

FIG. 4 shows, by way of example, a suitable circuit arrangement for effecting this sort of delayed pulse generation and tubes V2 and V3 and their associated circuitry are connected to form a conventional multivibrator having a single position of stability. In the absence of input pulses, tube V3 conducts while tube V2 is cut off. However, upon application of an input pulse from the video amplifier 52 in the control network, tube V2 is made to conduct and tube V3 is cut off, resulting in a positive pulse at the plate of V3. The interval for which V2 conducts and hence the duration of the positive pulse on the plate of tube V3 is dependent on the voltage on its control grid. This, in turn, is controlled by the locally generated timing signal supplied from the saw-tooth oscillator 54, which is there applied by way of the cathode follower stage V1. Accordingly there is available at the plate of tube V3, a positive pulse 101, as shown in FIG. 6B, the timing of whose leading edge 102 is determined primarily by a pulse 104 shown in FIG. 6A from the video amplifier 52 and the timing of whose trailing edge 103 is dependent on a timing signal from the saw-tooth oscillator 54. Accordingly, the trailing edge 103 of this pulse 101 can be used to provide a control pulse of the kind desired. To this end, the positive pulse 101 at the plate of V3 is applied to the control grid of phase inverter V4 by way of the differentiating network comprising the capacitance 101 and the resistance 102. There results then at the plate of the phase inverter V4, negative and positive pulses, shown in FIG. 6C as pulses 105 and 106, corresponding, respectively, to the leading and trailing edges of the pulse 101 at the plate of V3. Of these the positive pulse 106 only is passed by the clipping stage V5, and appears at the plate thereof as a negative pulse 107, shown in FIG. 6D. The negative pulse 107 can then be used as the disabling pulse for control of the input amplifier. Additionally, since it is usually desirable to provide a positive pulse for enabling purposes, the negative pulse 107 derived at the plate of tube V5 is applied for reversal as an input to the phase inverter tube V6, at whose plate there then becomes available a positive pulse 108, shown in FIG. 6E, suitable for enabling the output amplifier.

However, with reference again to FIG. 2, for the case in which it is desired that each outgoing pulse also act to reexcite the input receiver so that a train of pulses is developed in response to each received pulse in order that the enemy radar screen may be completely cluttered by spurious echoes, the switch 56 is set to position 2. In this case, the control network is not made to disable the input receiver as the pulses are being transmitted, which therefore remains in a state of receptivity. This results in regenerative operation to the ends sought. However, it will be usually desirable even in this case to disable the input receiver intermittently for short periods to prevent overload. For this reason, there is included a pulse generator 57 which will provide in response to the first control pulse developed by the control network and at a suitably later time after the cluttering effect sought has been obtained, a pulse which disables the input amplifier for a time longer than the period of a regenerative cycle. In the case of regenerative operation of this kind, it should be unnecessary to vary the delay provided by the control network as in the case previously described, in which case the delayed pulse generator 53 may be replaced by one of more conventional design, as for example, the pulse generator shown in FIG. 4 without the provision for modifying the delay time by means of a timing signal.

It is a further advantage of this range falsification arrangement that, if so desired, it can be used simultaneously without the addition of a separate antenna for falsifying angle information for use against conical radar scanners. In conventional angle falsification systems, falsification is accomplished by the use of amplitude inversion for causing returned echoes to be strongest for weak signals and weakest for strong signals.

To this end, the detected amplified pulse provided in the control network is supplied to a suitably designed amplitude inverter and storer 55 whose output, after being delayed for an interval equal to the delay of the pulse generator 53 (assumed fixed in this case), is applied, for example, to an appropriate gain control electrode of the broad band output amplifier 44 for providing amplitude inversion.

It should be evident that these range and angle falsification arrangements can be used either in combination as described or independently. Indeed, it may be possible to do wihtout the arrangement for angle falsification, since the output amplifier, if not overloaded, will necessarily deliver a widely varying output when the delay in pulse generator 53 is varied as shown because of the decay with time in the echo box, thus introducing an amplitude variation which may be much greater than that resulting from conical scanning alone and hence vitiating the angle tracking function of the radar along with the serious disturbance of the range tracking.

The arrangement described can be used in an analogous fashion with some modification in the identification of targets to a friendly radar. Such a modified arrangement is shown in FIG. 3.

As before, pulses received by the antenna 61 are applied to an input amplifier 62 and thereafter stored in a tuned echo box 63 until the time of utilization in the retransmission of the pulse. As in the previously described arrangements, there is provided a control network which serves to disable the normally unblocked input amplifier and to enable the normally blocked output amplifier 64 during periods of retransmission. An incoming pulse being applied to the echo box 63 is detected by the detector element 71 and after amplification by the amplifier 72, supplies a pulse generator 73 which, preferably, for positive identification, is adapted to provide a time coded series of pulses. Various arrangements for providing a coded series of pulses in response to an input pulse are known in the art and a suitable form is shown by way of example in FIG. 5. Each of these coded series of pulses is made to enable the output amplifier 64, for permitting retransmission for that time of the stored pulse energy, and to disable simultaneously the input amplifier 62 for preventing regeneration. The decay of the echo box 63 is adjusted so that a sufficiently large signal remains available for application to the output transmitter during each of the transmitting intervals. Accordingly there will be transmitted from the antenna a time coded series of pulses, each having the same frequency characteristics as the incoming pulse. It can be appreciated that this multiple transmission of a single pulse depends on the retentivity characteristics of the echo box. The friendly radar can then be made to recognize the coded series of pulses retransmitted for identifying the particular target as friendly.

Figure 3:
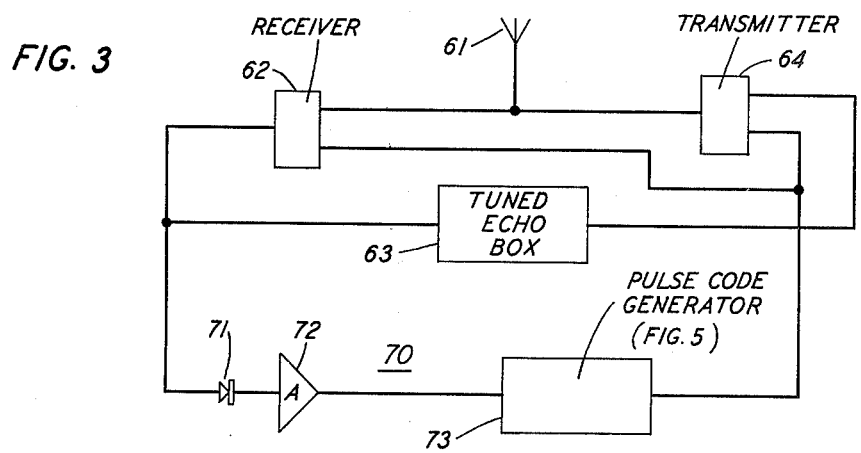
FIG. 3 shows in block form recognition apparatus in accordance with the invention.
Figure 7A:
Figure 7B:
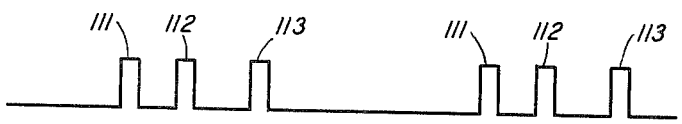

FIG. 5 shows one suitable form of pulse code generator for use in the identification arrangement of FIG. 3. The control pulse provided by the amplifier is applied as an input to one end of a conventional delay line 81, the other end of which is suitably terminated to minimize reflections. The delay line is provided with taps 82, 83 and 84 spaced along its length in accordance with a preset coded time pattern. As the control pulse travels along the delay line, it passes along each of the taps. In FIG. 7A, there is shown the control pulse 110 and in FIG. 7B, the pulses 111, 112 and 113, corresponding to the outputs derived at taps 82, 83 and 84. The pulses developed sequentially in the various taps are combined while preserving the same time relationships by a suitable adding circuit which, for example, is here shown as a series of amplifiers V7, V8 and V9 each supplied with a pulse from an associated tap of the delay line, the combined output being developed across a load 85 which is common to the plate circuit of each of the amplifiers. This combined output is then supplied as an input to the cathode follower V10, and the output therefrom is a coded series of pulses, each of which pulses is made simultaneously to disable the input receiver and enable the output transmitter to secure the operation desired.

Although several embodiments of delayed repeater systems in accordance with the invention have been shown, it should be evident from the flexible nature of these shown that various other arrangements can be devised by one skilled in the art without departing from the spirit and scope of the invention.

What is claimed is:

1. In combination, means normally unblocked for receiving incident wave energy pulses, a multi-resonant cavity supplied with the received pulses for storage of the radio frequency energy in said pulses, means normally blocked to be supplied with the received pulse energy for transmitting said received pulse energy after storage for a finite time in said multi-resonant cavity, a control circuit for disabling the receiving means and enabling the transmitting means at intervals subsequent to the reception of incident pulses, and a timing source for continuously varying the duration of said intervals.

2. In combination, means normally unblocked for receiving incident wave energy pulses, a multiresonant cavity supplied with the received pulses for storage of the radio frequency energy in said pulses, means normally blocked to be supplied with the stored pulse energy for transmitting said received pulse energy after storage for a finite time in said multi-resonant cavity, and control means for disabling the receiving means and enabling the transmitting means at intervals subsequent to the reception of incident pulses comprising detection means responsive to the received pulses, a pulse generator supplied by the output of the detection means for forming pulses at intervals subsequent to the reception of incident pulses, and a timing source supplying timing pulses to said pulse generator for continuously varying the duration of said intervals.

3. In combination, broad band frequency receiving means normally unblocked for receiving incident wave energy pulses of frequency which may vary within the frequency range of the receiving means, a broad band cavity resonator for the storage of the radio frequency energy in said incident pulses, broad band transmitting means normally blocked to be supplied with the stored pulse energy for reradiating said incident pulse energy of after storage for a finite time in said cavity resonator, a control circuit for disabling the receiving means and enabling the transmitting means at intervals subsequent to the reception of incident pulses, and a timing source for continuously varying the duration of said intervals.

4. In a system for reradiating incident wave energy pulses whose frequency may lie within a broad band, means operative over said broad band for receiving the incident pulses, broad band means for storing the radio frequency energy in said received pulses, broad band means supplied from the storing means for transmitting said received pulse energy, the receiving means and the transmitting means both being normally unblocked for permitting regeneration therebetween, and a control source for temporarily blocking the receiving means at intervals subsequent to the reception of the initial incident pulse and after reradiation of at least several pulses regenerated by said initial incident pulse.

5. In a system for reradiating incident wave energy pulses the frequency of which may lie within a broad band, means operative over said broad band for receiving the incident pulses, broad band means for storing the radio frequency energy in said received pulses, broad band means supplied from the storing means for transmitting said incident pulse energy after storage for a finite time in said broad band storage means, the receiving means and the transmitting means both being normally unblocked for permitting regeneration therebetween, control means for temporarily blocking the receiving means at intervals subsequent to the reception of the initial incident pulse and after reradiation of at least several pulses regenerated by said initial incident pulse, and means for controlling the gain of said broad band transmitting means comprising means for detecting the received pulses, means for inverting and storing said detected pulses and applying them to said transmitter after a predetermined time interval.

* * * * *